United States Patent [19]
Cabestrero

[11] Patent Number: 5,495,879
[45] Date of Patent: Mar. 5, 1996

[54] PROCESS AND APPARATUS FOR STABILIZING THE OSCILLATIONS OF A VEHICLE, AND VEHICLE EQUIPPED WITH SUCH AN APPARATUS

[75] Inventor: Abelardo Cabestrero, Almeria, Spain

[73] Assignee: Compagnie General des Etablissements Michelin - Michelin & Cie, Clermont-Ferrand Cedex, France

[21] Appl. No.: 175,263

[22] Filed: Dec. 29, 1993

[30] Foreign Application Priority Data

Dec. 31, 1992 [FR] France ................... 92 16054

[51] Int. Cl.$^6$ ................................ B60C 23/00
[52] U.S. Cl. ............................ 152/415; 141/38
[58] Field of Search ..................... 152/415, 416, 152/417; 141/38

[56] References Cited

U.S. PATENT DOCUMENTS

| | | | |
|---|---|---|---|
| 2,463,522 | 8/1949 | Davidson | 152/416 |
| 4,298,047 | 3/1981 | Bobard | 152/417 |

FOREIGN PATENT DOCUMENTS

| | | |
|---|---|---|
| 0440083 | 7/1991 | European Pat. Off. . |
| 92201 | 10/1968 | France . |
| 2373404 | 7/1978 | France . |
| 2399196 | 2/1979 | France . |
| 2657819 | 9/1991 | France . |

OTHER PUBLICATIONS

Patent Abstracts of Japan, vol. 16, No. 115 (M–1224) 23 Mar. 1992 & JP–A–03 284 401 (Toyo Umpanki) 16 Dec. 1991.

*Primary Examiner*—Michael W. Ball
*Assistant Examiner*—Francis J. Lorin
*Attorney, Agent, or Firm*—Brumbaugh, Graves, Donohue & Raymond

[57] ABSTRACT

An apparatus, method and vehicle in which the tires operate in accordance with stiff modes in order to increase the damping of their oscillations, the tires being filled practically completely with non-compressible fluid and being subject to the establishing of communications between at least one pair by connections filled with a constant volume of non-compressible fluid.

13 Claims, 2 Drawing Sheets

PROCESS AND APPARATUS FOR STABILIZING THE OSCILLATIONS OF A VEHICLE, AND VEHICLE EQUIPPED WITH SUCH AN APPARATUS

BACKGROUND OF THE INVENTION

The present invention concerns the control of the damping of tires of one or more axles of a vehicle provided with at least two tires, mounted on handling machines such as lift trucks, cranes or loaders used for civil engineering work.

The use of tires which are filled with gas under pressure on forklift trucks in replacement of solid tires has been crowned with success. However, it still raises certain problems which have been poorly solved up to the present time. These problems are due essentially to, at times, insufficient stability of the truck when the forks are in raised position up to several meters in height lifting or taking on a load.

In this configuration, and in similar cases observed with loaders or cranes, the flexibility and elasticity of the tires, combined with the distance at which the load is handled, transforms each movement of the vehicle or the load (particularly in the event of variation of force applying essentially to the load, the vehicle being at rest, or to the entire vehicle in movement due to the irregularities in travel) into a series of front to rear, left to right oscillations which are at times dangerous since there may be the risk of the toppling over of the vehicle. At the very least, these oscillations are extremely disturbing for the maneuvers of positioning the load. It is to be noted that these oscillations are of greater concern the more flexible and elastic that the tires are.

These parasitic movements could, of course, be limited if the vehicle were driven without abruptness, but then the overall efficiency might suffer. Moreover, these machines do not always have controls which are sufficiently gradual to be able to limit the undesirable oscillations or the means for damping them effectively.

It is already known to increase the stiffness of the tires used for handling applications either by filling them with polyurethane or with an incompressible material such as water, or by using reinforced inner tubes.

These solutions come down to transforming the tire in order to impart to it characteristics of stiffness which approach those of a solid tire, either permanently or intermittently as in the case of patent FR2657819. When the tire acquires the behavior of a solid tire due to these solutions, a significant increase in the load supported, due for instance to a transfer of load, is accompanied by a much smaller change in the vertical deformation of the tire, that is to say its sag, than in the case of a purely pneumatic tire, which greatly limits the amplitude of the oscillations caused by the transfer of load. On the other hand, the damping of these oscillations by the wheel or wheels is not always sufficient, due to the large residual elasticity of each liquid-filled pneumatic wheel.

The solution recommended in Japanese Patent Application No. 3-284401 proposes establishing a connection between the inside of each liquid-filled tire and an accumulator adapted to receive a certain amount of this liquid coming from one of the tires subjected to an additional force of dynamic compression due to jolts upon travel. The accumulator returns the liquid to the tire, which resumes its normal configuration via a restrictor bringing losses of head into the sole return flow of this liquid, in order to contribute a dampening of the vibrations. The diaphragm accumulator used makes it possible to limit the sudden variations in pressure, by maintaining the pressure at the level of pressure of the pressurized gas of the accumulator, permitting variations in volume and sag of the tire subjected to an addition force, which confers upon it less stiffness than if it had remained isolated and therefore full with a constant volume of liquid. The connections described place each liquid-filled tire in communication with the accumulator, these tires being also connected to each other, but without there being a direct transfer of liquid from one to the other, since the liquid is evacuated into the accumulator. It can therefore be noted that the volume of liquid within the system of connections between the tires is not constant due to the role of the accumulator. It will furthermore be noted that the damping of the vibrations by loss of head in the flow of the liquid takes place only in a single direction of movement of flow of the liquid. The use of such an arrangement causes the liquid-filled tire to lose the advantage of its very great stiffness, which generates vibrations of greater amplitude, with a limited capacity for the damping thereof.

SUMMARY OF THE INVENTION

The problem on which the invention is based consists in profiting from the advantages contributed by the tires from the points of view of price, life, resistance to advance, adherence, and comfort in travel, while adding advantages greater than those of solid tires or other devices for regulating the stiffness of the tires, with respect to the stability of the vehicle when moving or at standstill when it is handling a load, that is to say when there is a substantial displacement of the center of gravity of the unit consisting of the vehicle plus load, with or without the use of an accessory which facilitates the positioning of the load (translator), and particularly when the center of gravity is in an elevated position.

In order to stabilize the oscillations of a vehicle, for instance a handling machine, the present invention proposes decreasing the variations in sag and the oscillations of at least one pair of tires equipping said machine, further reducing in surprising manner as compared with the known means and even with respect to solid tires, both the amplitudes and the number of the oscillations resulting from the transfers of load inducing an additional deformation of at least one of the tires. The invention consists in establishing a constant-volume communication between at least two inner volumes of the tires filled with non-compressible fluid, these volumes being sufficiently spaced from each other, that is to say located on opposite sides of at least one of the vertical planes, longitudinal (in the direction of current displacement) or transverse (perpendicular to the foregoing), passing through the center of gravity of the vehicle.

In accordance with the invention, the device for stabilizing the oscillations of a vehicle equipped with at least two tires which are sufficiently spaced from each other, the tires and their rims defining inner volumes which are filled almost completely with non-compressible fluid and are connected together by a system of connections, is characterized by the fact that it is filled with a constant volume of non-compressible fluid and is formed of rotating joints, for example, rotatable fluid switches, and of conduits establishing communications between at least two inner volumes of these tires which are sufficiently spaced from each other. The said conduits may be calibrated at least in part so as to induce given losses of head in the flow of this liquid between the inner volumes of the connected tires. It goes without saying that the inner volumes of the tires may be completely or partially filled with non-compressible fluid, directly or via separate chambers.

In another embodiment of the invention, the arrangement is characterized by the fact that the conduits which are filled with non-compressible fluid are provided with at least one restrictor causing losses in head, each restrictor being possibly formed of a valve comprising a control means which regulates the loss of head introduced by the restrictor.

In other embodiments, the arrangement of the invention is characterized by the fact that it comprises at least one system of multiple connections which is provided with control means and is capable of maintaining said inner volumes either isolated from each other or connected together in the case of at least one pair, making it possible to select the inner volumes placed in communication.

Different embodiments of the invention may combine the roles of the systems of choice of the connections to be established and the roles of the restrictor valves, in a given assembly of multiple connections, in the case of at least one pair of tires.

In accordance with one embodiment of the invention, the arrangement is characterized by the fact that it comprises at least one pressure detector on the non-compressible fluid circuits. It is also possible to subject the control means of the multiple-connection devices and of the valves to the condition of operation of the vehicle.

The method of the invention for limiting the oscillations of a vehicle upon a transfer of load, the vehicle being equipped with at least two tires the inner volumes of which contain a non-compressible fluid, is characterized by the fact that it consists in establishing a communication filled with a constant volume of non-compressible fluid between at least two of these inner volumes which are sufficiently spaced from each other.

In accordance with the invention, a vehicle, part of which is capable of being displaced with respect to the rest of the vehicle, substantially changing the position of the center of gravity of the assembly, and having at least two tires filled at least almost completely with non-compressible fluid, is characterized by the fact that at least two of these volumes are connected together by a system of connections filled with a constant volume of non-compressible fluid and formed of rotating joints and of conduits establishing communications between these volumes, which conduits may be calibrated, that is to say, be of selected inner diameter, at least in part, to induce given losses of head in the direct flow of this fluid between the inner volumes of the connected tires. In particular, it is proposed to equip forklift trucks which permit stacking in height with a stabilization device described above, concerning at least each of the wheels of the axle closest to the forks in order to control the oscillations of the handling machine.

The complete filling of a tire by a non-compressible fluid makes it possible to impart to it a very high radial stiffness, which has the result of decreasing its variations in sag upon transfers of load, and therefore of minimizing the amplitude of the oscillations of the vehicle which is provided therewith. Among non-compressible fluids we note the interesting choices of liquids which as water or glycol or their mixture if it is necessary to expect a very low freezing temperature, with possibly stabilizing additives, or viscosity-increasing additives.

By way of illustration, we will compare the behavior under variations in load of a 225/75 R 10 XZM tire filled completely at 10 bars either with air or with water. In the first case, the addition of a load of 4475 kg makes its inflation pressure change to 10.380 bars, which corresponds to a variation of inner volume due to the crushing of 1.06 liter, namely 3.3%. In the second case, such a variation in volume cannot be absorbed by the water, and the tire reinforcements lengthen so that the inner volume remains constant, which causes a strong increase in the pressure of the fluid in order to balance out the forces within the tire, imparting to it a very high stiffness, resulting in a slight crushing for a strong variation in load and therefore a decrease in the amplitudes of oscillations upon transfers of load onto a vehicle equipped with such tires, which effectively improves its stability, bringing it to the level of that of the same vehicle equipped with solid tires.

It has been discovered that when two or more tires, whether or not of the same axle, which are filled with non-compressible fluid in order to impart high stiffness to them are connected together by rotating joints and communication pipes of constant volume, there is obtained, at the same time, both a greater decrease of the amplitudes and number of the oscillations caused by the displacement of the load than in the absence of such communication, with a result superior to that of solid tires or isolated, water-filled tires. In fact, an overload applied to one of the connected tires which, without communication, would lead to repeated oscillations, produces an excess pressure which makes it possible, in the presence of constant-volume communication, surprisingly to use the reaction of the other connected tire, in this case decreasing the number and amplitude of the oscillations, with the contribution in the losses in head of the communication pipes in the alternate flow of the non-compressible fluid.

In other versions of the invention, the losses in head are either those of the pipes, which may be calibrated at least in part for this purpose, or those of restrictors, possible adjustable, located on their path or both, which provides the vehicle with an additional oscillation-damping aptitude, it being possible to regulate this damping by adapting it to factors such as the volume of the tires, the type of non-compressible filling fluid and the load transported, and making it subject to the operating conditions, in particular, the position of the load, the speed, the oscillations, accelerations, and vibrations of the vehicles provided with such connected wheels.

The placing in communication of the inner volumes of the tires can be installed permanently between the wheels of one and the same axle or of different axles, or be brought about upon demand by the intervention of the driver of the equipped vehicle, or be effected automatically as a function of the factors cited above and the state of operation of the vehicle, and be realized by multiple connection devices.

It is, however, recommended to equip at least each connection per pair of tires with a valve which permits the isolating of the circuit in case of the removal of a tire in order to avoid the depressurization of the other connected tires. The adjustment of the restrictors may also be made automatic so as to depend on the condition of operation of the vehicle and the factors mentioned.

All these adaptations are a matter of simple dimensioning and adjustment as a function of the application desired. It is possible to provide a system of connections which makes it possible to isolate the inner volumes of the different tires of a vehicle which is thus equipped or to connect, as desired, two inner volumes or pairs of two inner volumes, whether they be located on the right and left sides of the vehicle or in the front and rear respectively, in order to dampen preferentially rolling or pitching oscillations, or to connect all of the inner volumes of the tires of the vehicle together. Of course, assemblies of twin tires which are sufficiently spaced from each other and filled with non-compressible fluid are not excluded from the application of the invention, considering a twin pair the inner volumes of which communicate as a single inner volume.

It has been observed that this manner of use of the tires, which makes it possible substantially to improve the stability of the handling machines which are equipped with them, can be accompanied by a loss of the advantages of the tire with respect to comfort. However, the presence of gas in at least one of the inner volumes of the tires filled with non-compressible fluid which are connected in accordance with the invention confers upon them a radial stiffness which decreases very rapidly with the increase in the amount of gas, which makes it possible to improve the comfort. A slight stiffness can be obtained close to that of an air-inflated tire by a filling comprising 80% non-compressible fluid and 20% gas. In order to improve the comfort while retaining a high range of stiffness useful in the invention, it is recommended not to leave more than 12% gaseous volume in a tire filled practically entirely with non-compressible fluid, and preferably not more than 6%. The expression "high stiffness" means here that the stiffness of the tires filled completely or partially with non-compressible fluid is substantially greater than that of tires inflated essentially by a compressible gas.

DESCRIPTION OF THE DRAWINGS

The following figures will make it possible better to understand the invention and its various advantages.

DESCRIPTION OF PREFERRED EMBODIMENTS

Figure 1:
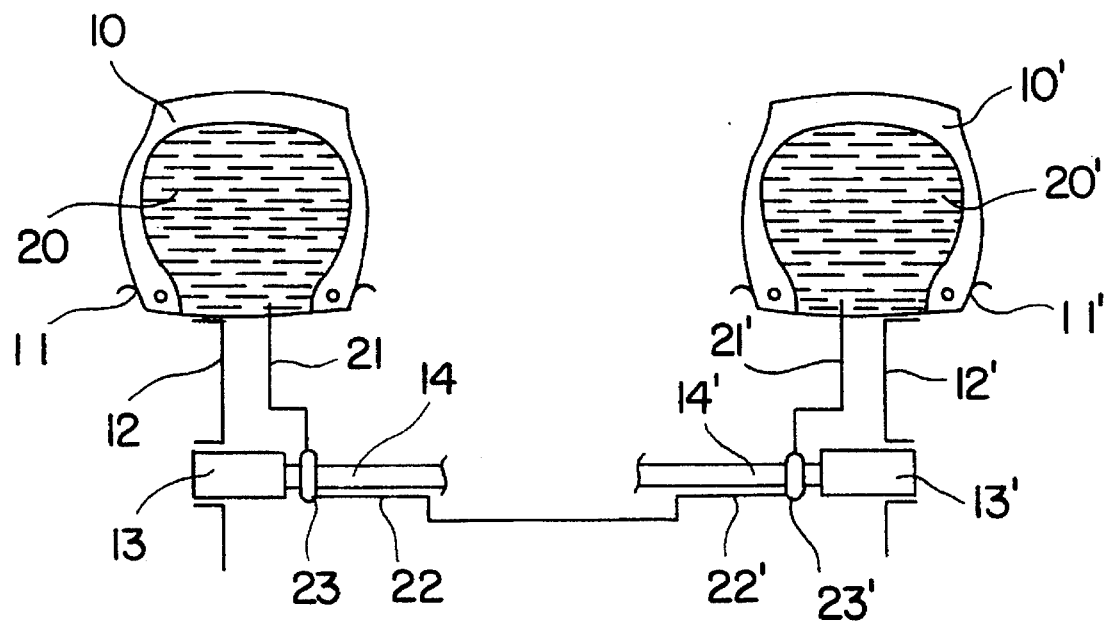
FIGS. 1 and 2 show two schematic embodiments of the invention.

FIG. 1 shows at least two tires 10, 10' of a vehicle, mounted respectively on their rims 11, 11', which, in their turn, are rigidly attached by wheel disks 12, 12' to hubs 13, 13' corresponding the ends of the shafts 14, 14'. Of course, the shafts 14, 14' may or may not belong to the same axle and be located on opposite sides or on the same side with respect to the central plane of the vehicle. The tires 10, 10' and their rims 11, 11' define their inner volumes 20, 20' which are filled with non-compressible fluid. Pipes 21, 21' make it possible to place the inner volumes 20, 20' in communication via pipes 22, 22' provided with one or two rotating joints 23, 23'. The losses in head on the flow of the non-compressible fluid depend on the selection of the pipes, or their calibration over at least a part of their length.

Figure 2:
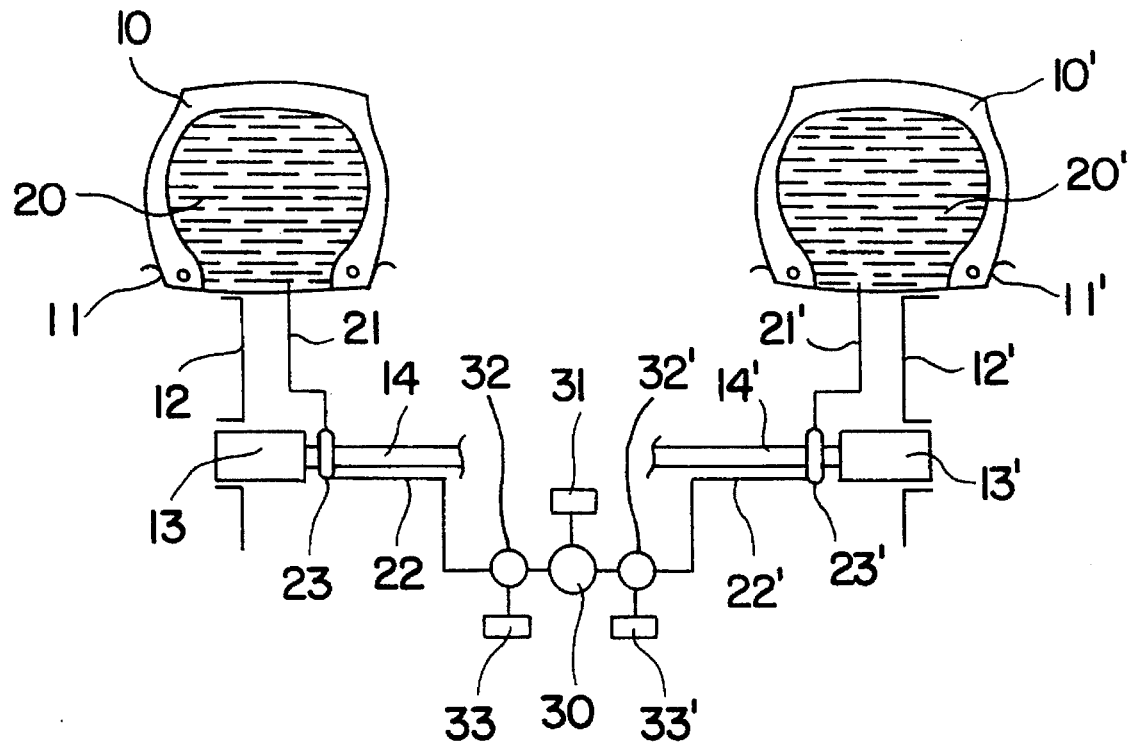

This communication can be installed permanently as in FIG. 1 or else, as in FIG. 2, via a connecting device 30 which connects the pipe 22 to the pipe 22', the device 30 being possibly provided with control or servo means 31. The losses in head of the pipes 21 to 21' connecting the inner volumes 20, 20' are determined by restrictors 32, 32' which may be valves equipped with control or servo means 33, 33' which regulate the damping depending on the condition of operation of the vehicle.

In a different embodiment, the functions of the systems 30, 32, 32' can be regrouped in a single multiple connection device which assures the placing in communication in accordance with the different operating choices and can be automatically controlled by the conditions of operation of the vehicle.

It is moreover particularly interesting for the improvement in safety contributed by the arrangement of the invention to be tested continuously, which can be effected by the addition of at least one pressure detector on the circuit or circuits of the non-compressible fluid, making it possible to check the operation of the damping device and possibly its automatic control. It may be advantageous to add to this control means a system of selection and adjustment of the pressure of the non-compressible fluid of the inner volumes.

As a function of the conditions of use, one may select different modes of connection such as those described in the examples indicated below by way of illustration and not of limitation of the invention. FIGS. 3 to 9 schematically show different states of the possible connections of the communicating circuits of the inner volumes of the tire of a four-wheel vehicle which are mounted on two axles equipped with tires filled with non-compressible fluid and provided with devices in accordance with the invention. The functions of the connection devices are symbolized therein by diagrams of three-way valves.

Figure 3:
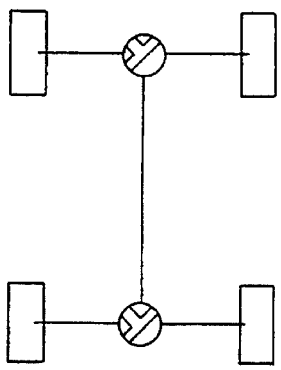
FIGS. 3 to 9 illustrate different possibilities for the application of the invention to a vehicle provided with 2 axles.

FIG. 3: The inner volumes of the tires are isolated one from another. The damping of the oscillations is substantially equivalent to that contributed by solid tires in place of pneumatic tires.

Figure 4:
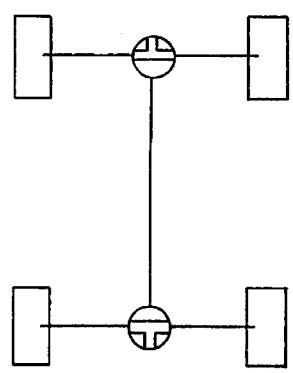

FIG. 4: The inner volumes of the tires communicate in pairs on the same axle, in order to obtain a substantial damping of the oscillations, particularly with respect to their lateral components, with an effectiveness greater than that obtained with solid tires.

Figure 5:
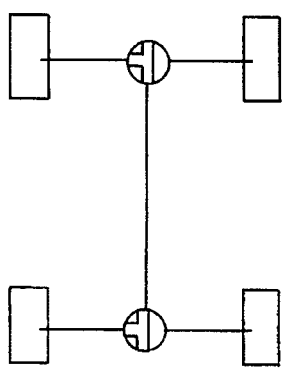

FIG. 5: The inner volumes of the tires communicate in pairs on the same side of the vehicle, in order to obtain a substantial damping of the oscillations, particularly with respect to their longitudinal components, with an efficiency greater than that obtained with solid tires. Depending on the case, the side of the vehicle selected for this connection will be the left or the right.

Figure 6:
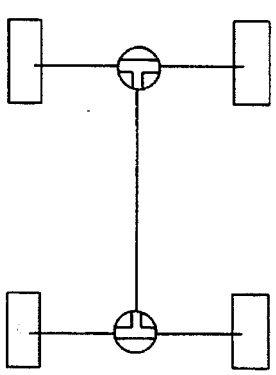

FIG. 6: The four inner volumes of the tires all communicate with each other in order to obtain, as a whole, a very great stiffness and a general damping of the oscillations greater than that obtained with solid tires.

Figure 7:
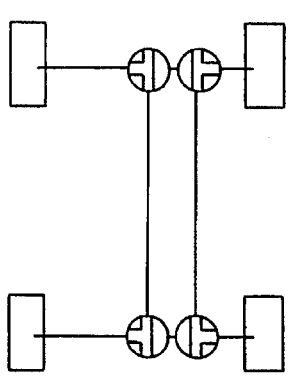

FIG. 7: The four inner volumes of the tires communicate in pairs on each side of the vehicle, in order to obtain a large damping of the oscillations, particularly with respect to the their longitudinal components, greater than that obtained with solid tires.

Figure 8:
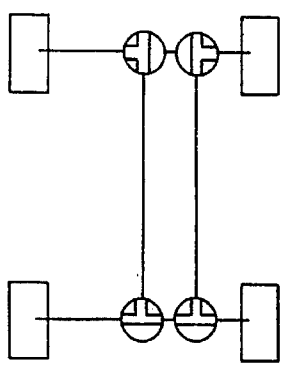

FIG. 8: The four inner volumes of the tires communicate with each other by a series connection, imparting a very high stiffness to the assembly, with a mode of total damping of the oscillations greater than that obtained with solid tires.

Figure 9:
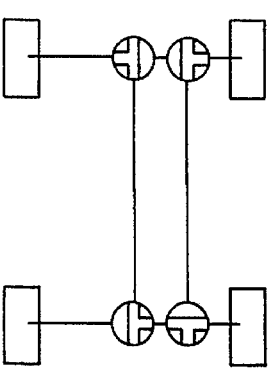

FIG. 9: The inner volumes of two tires communicate in accordance with a diagonal connection, these tires belonging to different axles and to opposite sides of the vehicle, in order to obtain a good compromise of simultaneous damping of lateral and longitudinal oscillations which is greater than that obtained with solid tires, with a good resting stiffness.

Various other schemes of communication of the inner volumes can be developed, comprising different numbers of valves or connections, including on vehicles comprising a different number of tires and/or axles, without thereby going beyond the scope of the invention, the number and nature of these communication being capable of being adapted case by case as a whole for the vehicle.

The measurements described in the following examples make it possible to show the contribution made by the invention on an C.V.-120 lift truck equipped on its front axle with two 8.25 R 15 XZM tires provided with systems making it possible to fill them with desired volumes of non-compressible fluid under pressure, and systems of connection according to the invention, the rear axle being equipped in standard manner.

Conditions of the measurements: The forks of the truck support a load of 4000 daN at a height of 2.7 meters. A lateral force of 1000 daN is applied horizontally on the load and its sudden interruption causes oscillations of the vehicle as a whole, and of the tires which undergo alternate compressions. Pick-ups record the number and amplitudes of the oscillations of the vehicle as a function of time until stability is reached. On the recording, the number N of oscillations and their amplitudes A are counted on the graph obtained. The amplitude of the first oscillation after the interruption of the force is the greatest and it is noted as A max. The cumulative sum of all the recordable amplitudes is indicated as C.

Different cases studied are set forth in the following table:

| Examples | Content of the Front Tires | | Relationship Between Front Tires | N | A max | C |
| --- | --- | --- | --- | --- | --- | --- |
| A1 | Solid tires (comparative) | | None | 13 | 6 | 12 |
| C1 | 100% water | 1 lb. | None | 13 | 7 | 17 |
| C2 | 100% water | 1 lb. | Communication | 2 to 3 | 4 | 5 |
| C3 | 80% water 20% air | 1 lb. | Communication | 7 to 8 | 8.5 | 17.5 |

It is noted that the invention contributes both rigidity of the type of that of solid tires and a very substantial damping far superior to that of solid tires and certainly far superior to that of tires containing a compressible gas.

This invention therefore makes it possible to solve the problems specifically arising from the use of tires on fork handling machines. However, the scope of the invention is by no means limited to the embodiments described; it can be applied in other types of vehicles, whenever it is desired to vary the damping and the stiffness of the tires for any reason whatsoever.

Thus, what has been stated above can be applied to construction loaders mounted on tires. In this case, also, extensive oscillations may arise, bucket loaded and in raised position, at the time when the loader is near the truck. While the safety can, at times, be jeopardized as in the case of lift trucks, the oscillations may also cause problems in precision of discharge of the contents of the bucket at the time when it tilts, and the material itself may also suffer sudden contacts between the loader and the truck. One can also find similar examples with other lifting machines such as cranes mounted on tires, for which the arrangement in accordance with the invention contributes an unequalled unparalleled solution for the problem of oscillations.

More generally, an arrangement of this type can be installed on all the vehicles which may be in a similar situation, that is to say all vehicles a part of which can be displaced, placed protruding with respect to the rest of the vehicle, substantially changing the position of the center of gravity of the assembly.

For the automatic controls of the connecting valves, one can, as a rule, provide a system sensitive to the condition of operation of the vehicle in order that they be actuated by a microprocessor programmed in suitable fashion, receiving the signals of different types of pick-ups, alone or combined: longitudinal and transverse accelerations, vibrations, speeds of displacement, condition of the controls for the handling members of the loads or the vehicle.

I claim:

1. An apparatus for stabilizing oscillations of a vehicle equipped with at least two tires on rims, the two tires and rims being located on opposite sides or ends of the vehicle, the tires and their rims defining two volumes containing non-compressible fluid, said apparatus comprising a system of fluid transmission connections between said inner volumes of the tires, said system being filled with a constant volume of non-compressible fluid, and rotating joints and conduits establishing fluid transmission communications between at least the two inner volumes of said tires which are respectively located at opposite sides or ends of the vehicle and on opposite sides of one of the vertical planes passing through the center of gravity of the vehicle.

2. An apparatus according to claim 1, characterized by the fact that at least one of the conduits is of calibrated diameter at least in part in order to introduce losses in head in the flow of the non-compressible fluid between the inner volumes of the connected tires.

3. An apparatus according to claim 1, in which said system includes multiple fluid transmission connections provided with control means for said rotating joints and conduits and capable of maintaining the said inner volumes either isolated from each other or connected together, permitting selections of communications.

4. An apparatus as set forth in claim 1 in which the conduits filled with non-compressible fluid are provided with at least one restrictor which makes it possible to adapt the level of the losses in head in the flow conduits for the flow of the non-compressible fluid.

5. An apparatus according to claim 4, in which the at least one restrictor is a valve having control means for regulating the losses in head.

6. An apparatus according to claim 3, in which there is a plurality of rotating joints and conduits in a fluid connection between the inner volumes of a pair of tires.

7. An apparatus as set forth in claim 1 including at least one pressure detector in the non-compressible fluid communications.

8. An apparatus according to claim 3, in which at least one of the control means is automatically controlled by the condition of instability of the vehicle.

9. A method of limiting the oscillations of a vehicle equipped with at least two tires located on opposite sides or ends of the vehicle, the inner volumes of which contain a non-compressible fluid, characterized by the fact that the method includes establishing a communication filled with a constant volume of non-compressible fluid between at least two of these inner volumes respectively located on opposite sides of one of the vertical planes passing through the center of gravity of the vehicle.

10. An apparatus for stabilizing oscillations of a vehicle equipped with a plurality of tires, the tires having inner volumes containing non-compressible fluid, said apparatus comprising a system of fluid transmission conduits filled with a constant volume of non-compressible fluid connecting the inner volumes of said tires and a fluid switch means interposed in the system for selectively establishing a fluid transmission connection between inner volumes of tires located at opposite sides or ends of the vehicle and on opposite sides of one of the vertical planes passing through the center of gravity of the vehicle.

11. A vehicle as set forth in claim 10 in which the inner volumes of the tires which are interconnected are located on opposite sides of a longitudinal plane passing through the center of gravity of the vehicle 12. A vehicle as set forth in claim 11 in which the inner volumes are located at opposite ends of the front axle.

13. A vehicle, a part of which is capable of being displaced with respect to the rest of the vehicle, substantially changing the position of the center of gravity of the vehicle, comprising at least four tires having inner volumes containing non-compressible fluid, and at least two tires on each side of the vehicle and located on opposite sides of a longitudinal plane passing through the center of gravity of the vehicle and at least two tires at each end of the vehicle and located on opposite sides of a transverse plane passing through the center of gravity of the vehicle, a system of fluid transmission connections between said inner volumes of the tires, said system being filled with a constant volume of non-compressible fluid, and rotating joints and conduits establishing fluid transmitting communications between at least two inner volumes of tires which are spaced from each other at opposite sides or ends of the vehicle and on opposite sides of one of the vertical planes passing through the center of gravity of the vehicle.

\* \* \* \* \*